(12) United States Patent  
Heubach

(10) Patent No.: US 8,206,524 B2  
(45) Date of Patent: Jun. 26, 2012

(54) METHOD AND DEVICE FOR PRODUCING FILM COMPOSITES

(75) Inventor: Lutz Heubach, Lichtenstein (DE)

(73) Assignee: Muehlbauer AG, Roding (DE)

( * ) Notice: Subject to any disclaimer, the term of this patent is extended or adjusted under 35 U.S.C. 154(b) by 261 days.

(21) Appl. No.: 12/302,613

(22) PCT Filed: May 21, 2007

(86) PCT No.: PCT/EP2007/054856  
§ 371 (c)(1),  
(2), (4) Date: May 22, 2009

(87) PCT Pub. No.: WO2007/137956  
PCT Pub. Date: Dec. 6, 2007

(65) Prior Publication Data  
US 2010/0018627 A1   Jan. 28, 2010

(30) Foreign Application Priority Data

May 30, 2006   (DE) .......................... 10 2006 025 504

(51) Int. Cl.  
*B32B 41/00*   (2006.01)

(52) U.S. Cl. .......... 156/64; 156/360; 156/361; 156/362; 156/367; 156/378

(58) Field of Classification Search .............. 156/64, 156/360, 361, 362, 378, 379, 366, 367, 368  
See application file for complete search history.

(56) References Cited

U.S. PATENT DOCUMENTS

| | | | | |
|---|---|---|---|---|
| 4,294,637 A | * | 10/1981 | Rump | ........................... 156/157 |
| 5,150,539 A | | 9/1992 | Hamamura et al. | |
| 5,473,406 A | * | 12/1995 | Hassall et al. | .................. 355/22 |
| 5,753,349 A | | 5/1998 | Boswell | |
| 5,827,392 A | | 10/1998 | Buckley et al. | |
| 2003/0012914 A1 | * | 1/2003 | Klein et al. | .................. 428/42.3 |

FOREIGN PATENT DOCUMENTS

| | | |
|---|---|---|
| DE | 10254504 | 6/2004 |
| EP | 1452297 | 9/2004 |
| WO | 0027634 | 5/2000 |

* cited by examiner

*Primary Examiner* — George Koch  
(74) *Attorney, Agent, or Firm* — John A. Miller; Miller IP Group, PLC

(57) ABSTRACT

The invention relates to a method and a device for producing film composites. In a first method step, a first individual film is picked up by at least one first gripping device and the gripping device is moved together with the film in a first movement direction. In a further method step, the position of the film in the first movement direction is determined, and the film is fixed at a predefined position in the first movement direction. In a further method step, the position of the first film in a second movement direction is determined, said second movement direction being substantially perpendicular to the first movement direction, and the first film is moved in a second movement direction. According to the invention, the film is gripped by a second gripping device for transport in the second movement direction.

17 Claims, 4 Drawing Sheets

METHOD AND DEVICE FOR PRODUCING FILM COMPOSITES

PRIORITY CLAIM

This application is a national phase application of PCT/EP07/54856 filed on May 21, 2007, which claims priority to German Application Serial No. DE 10 2006 025 504.6 filed on May 30, 2006, each of which is hereby incorporated by reference.

The present invention relates to a method and a device for producing film composites. Such film composites are used for example in the production of cheque cards or other identification cards. For this, one or more films are bonded to a carrier material or to one another, and finally the individual cards are punched out of the composite thus formed. Said composite comprises in particular one or more plastic films which exist in a printed or non-printed form. During production, it is necessary for these films to be arranged one on top of the other and to be aligned with respect to one another. Since these films usually have very small thicknesses, in particular the process of aligning the films with respect to one another is very complicated.

It is known from the prior art to deposit a film by means of a transport device, which moves the film in a predefined direction, and by means of two grippers onto a transport belt which transports the films in a further direction. This second transport comprises an endless film which is pulled in the transport direction in a motor-driven manner. In a further step in the prior art, the film or the sheet is gripped and is deposited in a defined manner, according to an XY position of printed marks which is determined by two cameras, on a transport film of the X-transport as the first sheet or on an existing aligned sheet or an existing aligned set of sheets. Finally, the set of sheets is welded. This procedure is repeated until all the associated films have been deposited, aligned and welded. Thereafter, a further endless film is supplied from above and is welded to the resulting set. In a further step, the set of sheets is cut and the cut pieces are deposited on a stack. It is thus necessary in the prior art to use cost-intensive camera systems in order to align the individual films with respect to one another.

Moreover, the method known in the prior art is relatively time-consuming. Also known from the prior art are methods in which a transport of the sheets or films is carried out in a first direction or Y-direction and in a second direction or X-direction perpendicular thereto. In this case, transport devices for transport in one direction are arranged on the transport devices in the other direction. By way of example, it is known that Y-servo shafts are mounted on an X-servo shaft.

The object of the present invention is therefore to reduce the costs of the production devices and methods according to the invention and in addition also to reduce the cycle time and thus increase the throughput. Finally, a method which is more flexible with regard to different sheet formats, sheet numbers and processing with or without an endless film is also to be provided.

This invention is achieved according to the invention by a method according to claim 1 and a device according to claim 8. Advantageous embodiments and further developments form the subject matter of the dependent claims.

In the method according to the invention for producing film composites, in a first method step a first individual film is picked up by at least one first gripping device and the gripping device is moved together with the film in a first movement direction. In a further method step, the position of the film in the first movement direction is determined, and the film is then fixed at a predefined position in the first movement direction. In a further method step, the position of the first film in a second movement direction is determined, said second movement direction being substantially perpendicular to the first movement direction, and the first film is moved in the second movement direction.

According to the invention, the film is gripped by a second gripping device for transport in the second movement direction. According to the invention, therefore, firstly a movement in a first direction takes place and a position in this first movement direction is determined. The position in the second movement direction is then determined, and a corresponding movement takes place in this second movement direction. Due to this separation of the individual movement processes, the optical position detection can be considerably simplified compared to the prior art. More specifically, no complicated camera systems are required in order to determine the respective position of the film, but rather this position determination can also be carried out via simple printed mark sensors and surface sensors. It is thus possible for example to use an optical fibre or laser which detects a certain mark on the film and thus determines the position thereof.

Preferably, once the respective position of the film has been determined in both movement directions, this film is aligned, wherein the alignment preferably takes place by a pulling of the film. By means of this pulling, it is possible to prevent any bending of the respective, very thin films. The terms film and sheet are used synonymously below.

In one preferred method, therefore, the determination of the precise location of the film is in each case carried out in such a way that the film has in any case not yet reached its respective target location and thus in each case can be pulled towards its target location. This can be achieved by suitably arranging the sensors for determining the location of the film.

In one preferred method, the first gripping device can move only in the first movement direction and the second gripping device can move only in the second movement direction. In this case, the two gripping devices can particularly preferably be moved independently of one another, and in particular there are independent servo shafts, by means of which the gripping devices can be moved independently of one another.

In a further advantageous method, the first film is pushed at least partially over or under a second film and the films are aligned with respect to one another based on their respectively determined positions. This process can be repeated accordingly when forming stacks consisting of a plurality of individual films. In this case, in different method steps, firstly for example two first films are aligned with respect to one another and then these are aligned with a further film, and so on.

In a further preferred method, the first film and the second film are aligned with respect to one another in the second movement direction. Here, the two films are preferably already respectively aligned in their first direction. After the alignment, the films are particularly preferably fixed with respect to one another by a holding device. This may be for example a plunger device which presses the two films against one another perpendicular to the plane of the film.

In a further advantageous method, once the film has been aligned, the gripping devices are detached from the film or from a plurality of films. After this detachment, a resetting or return stroke of the respective gripping devices is possible. Preferably, these are gripping devices which grip for example two opposite edges at two spaced-apart regions of the film, and can in each case be controlled independently of one another. A rotation of the film is thus also possible to a certain degree by means of an appropriate relative movement of the two gripping devices.

Once the gripping devices have been detached from the film, a transport of the film or of the set of films is possible for example on a conveyor belt.

In a further method according to the invention, in a further method step, the film or stack of films are bonded and in particular welded to at least one film carrier.

The present invention also relates to a device for producing film composites, which comprises a first movement device and at least one gripping device arranged on the first movement device for gripping a film and moving the film in a first movement direction. Also provided is a first position determination device which determines the position of the film in the first movement direction, and also a control device which controls the movement of the first movement device in reaction to the position determined by the first position determination device.

Also provided is a second movement device with at least one second gripping device arranged on the second movement device for gripping the film and moving it in a second movement direction. Also provided in addition is a second position determination device which determines the position of the first film in the second movement direction. In this case, a control of the second movement device preferably likewise takes place via the control device in reaction to the position determined by the second position determination device. According to the invention, the first gripping device can move essentially only in the first movement direction and the second gripping device can move essentially only in the second movement direction, and the two gripping devices can move independently of one another.

The present invention also relates to a device for carrying out a method of the type described above, wherein this device comprises a first movement device and at least one gripping device arranged on the first movement device for gripping a film and moving it in a first movement direction. Also provided is a first position determination device which determines the position of the film in the first movement direction, and a control device which controls the movement of the first movement device in reaction to the position determined by the first position determination device. Also provided is a second movement device with at least one second gripping device arranged on the second movement device for gripping the film and moving it in a second movement direction. Also provided in addition is a second position determination device which determines the position of the first film in the second movement direction.

In a further preferred embodiment, a further first movement device is provided, on which there is arranged a further first gripping device for gripping a film and moving it in the first movement direction. In this way, a plurality of films can also be arranged one on top of the other. A further position determination device is preferably also provided on this further first movement device. The term first movement devices will be understood below to mean those movement devices which move the films in the first movement direction. Second movement devices will be understood to mean those movement devices which move the films in the second movement direction. It is also possible to provide a plurality of first movement devices, depending on how many different films are to be arranged one on top of the other. The device according to the invention can also be set to produce film composites comprising a larger or smaller number of films, by switching on and off individual first movement devices.

The movement devices are preferably servo shafts.

In a further preferred embodiment, the first position determination device is a printed mark sensor. With particular preference, the second position determination device is a surface sensor. Accordingly, the first position determination device is also understood to mean a position determination device which determines the position of the films in the first direction, and a second position determination device is understood to mean a device which determines the position of the films in the second movement direction.

Further advantages and embodiments will emerge from the appended drawings:

Figure 1:
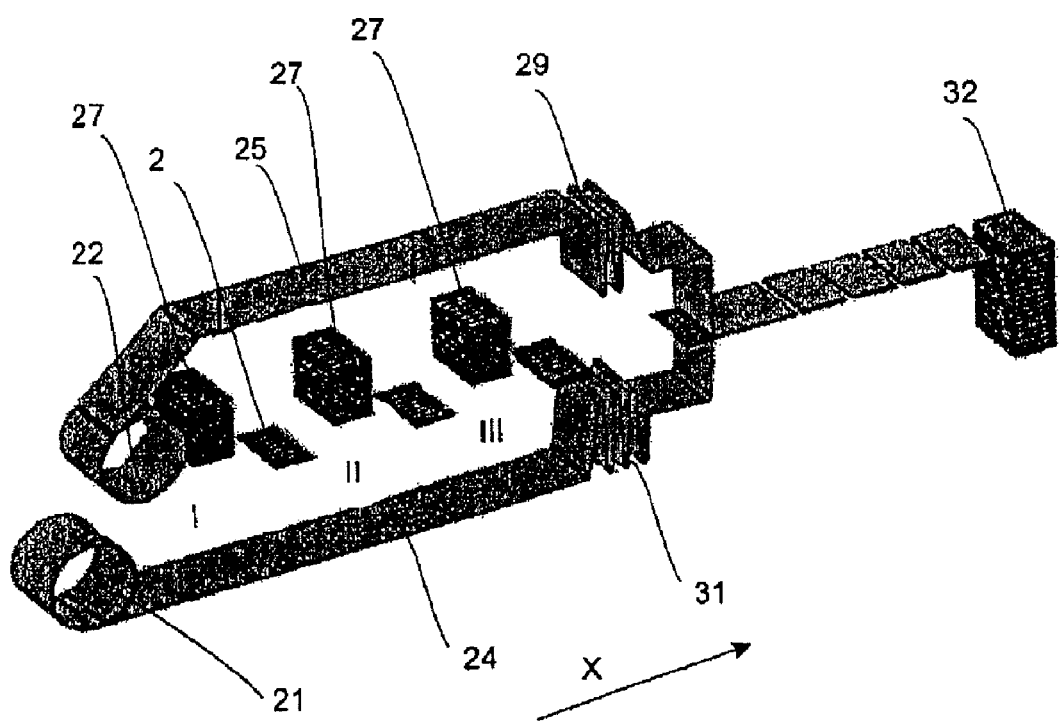
FIG. 1 shows a schematic diagram to illustrate the method according to the invention.

FIG. 1 shows a schematic diagram to illustrate the method according to the invention. In this method, endless film 24, 25 is in each case unwound via two unwinding devices or rollers 21 and 22 and then is transported in the X-direction. In the embodiment shown here, three stacks 27 are provided comprising films 2, 6, 7 that are to be arranged one on top of the other. By means of the devices according to the invention, the individual films 2, 6, 7 are taken from the respective stacks and are deposited in a defined position by determining printed marks (more specifically by using printed mark sensors and a respective vision sensor per collating unit). A directional transport then takes place between the two endless films. In this regard, it is pointed out that the use of endless films may also be omitted in other production methods according to the invention.

References 29 and 31 denote two buffer devices which serve for controlling the speed of the unwinding roller. More specifically, the speed of the unwinding devices is controlled as a function of the filling levels of the buffer devices 29, 31. In the individual processing stations I, II and III, firstly a first film 2 is deposited and then a second film 6 is deposited on this first film and then a further film 7 is in turn deposited on the second film. These films are aligned with respect to one another in individual method steps. Finally, the films or sets of films, i.e. the collated films, are welded to the endless films 24 and 25 at the respective film start and at the film end. In a further method step (not shown in detail), the welded film bundles are cut according to the size of the films 2, 6, 7. During transport, the endless films 24, 25 are likewise removed according to the film size. If no endless film is used, the respectively welded film bundles are removed.

Finally, the welded and cut film bundles are deposited on a stack 32 in an ordered manner.

Instead of the respective three films shown here which are bundled, it is also possible to bundle together a larger or smaller number of films and it is also possible to bond just one film for example to an endless film 24.

In a further process, individual card segments are punched out of the film bundles thus produced, said card segments already being defined on the films.

Figure 2:
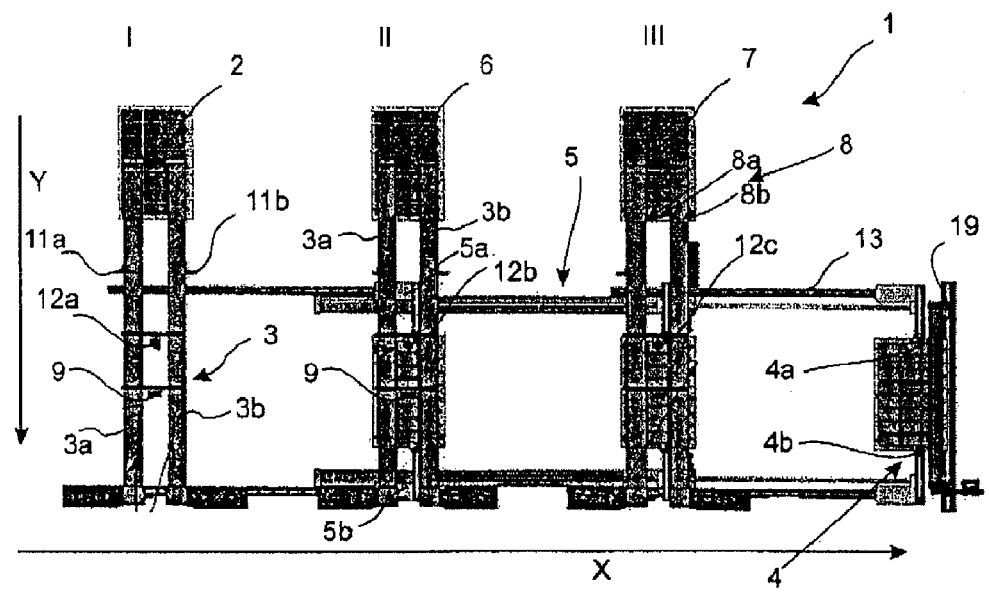
FIG. 2 shows a schematic diagram of a device according to the invention in a first operating position.
Figure 3:
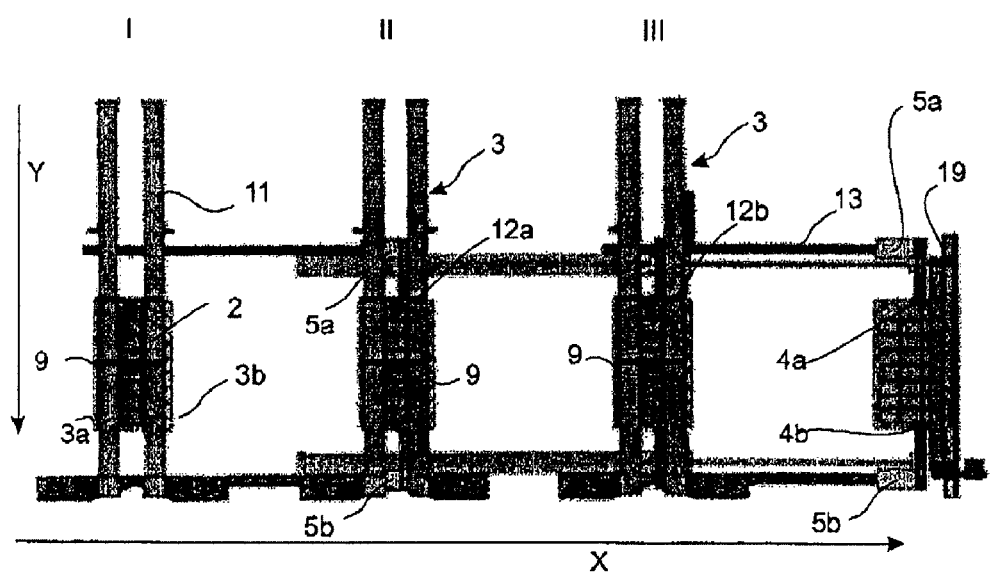
FIG. 3 shows a schematic diagram of a device according to the invention in a second operating position.
Figure 4:
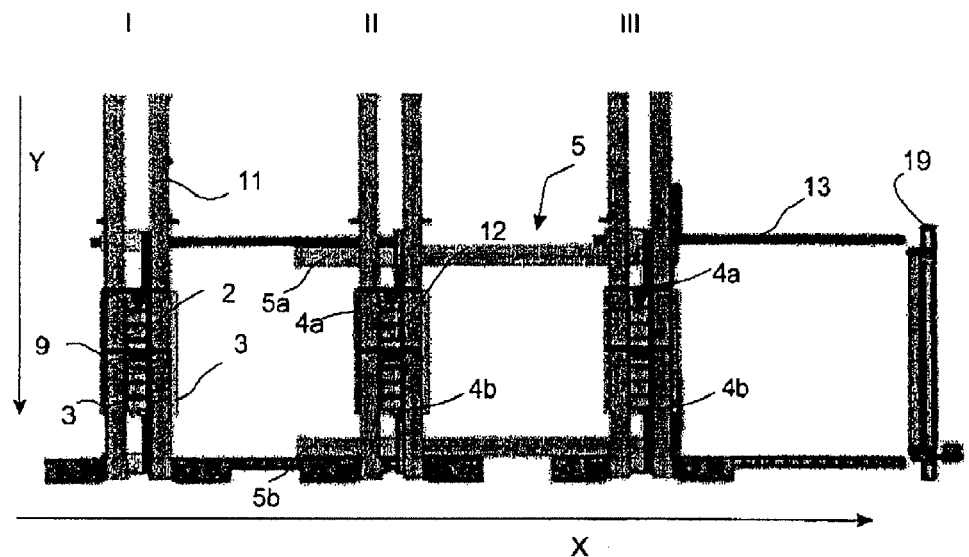
FIG. 4 shows a schematic diagram of a device according to the invention in a third operating position.

FIGS. 2 to 4 show a device according to the invention in different method steps. Here, three workstations I, II and III are provided, so that in the present case in each case three films are arranged one on top of the other. Each of these workstations comprises a first movement device 3 for moving the films in the first movement direction Y. These movement devices are provided here in each case in the form of two servo shafts 3a, 3b arranged parallel to one another, on which respective first gripping devices 8 are arranged which grip the respective film 2, 6, 7. Here, the gripping devices are arranged preferably in each case on the outside of the two servo shafts 3a, 3b, in order to achieve the greatest possible distance between the two gripping devices 8. The two servo shafts 3a, 3b can also be controlled independently of one another. The gripping devices in each case comprise two gripping elements 8a, 8b.

Reference 9 denotes a fixing device which fixes the film with respect to a support, said film in particular already having been aligned. Said support may be for example a pressure plunger or the like.

References 11a, 11b here denote printed mark sensors which are respectively arranged on the servo shafts 3a, 3b and which are preferably designed with optical switches and together form the first position determination device.

These printed mark sensors 11a, 11b serve to determine the position of the film in the first movement direction Y.

Reference 5 denotes second movement devices, by means of which the film can be moved in the X-direction. These are designed here as servo shafts 5a, 5b. In addition, linear guides 13 are provided which are mechanically coupled in each case to the movement devices 5. In this embodiment, two servo shafts 5a, 5b are provided which are likewise independent of one another and allow a movement of the films in the X-direction.

Corresponding second gripping devices with gripping elements 4a, 4b likewise serve for gripping the films for a movement thereof in the X-direction. These gripping elements 4a, 4b are also spaced as far apart from one another as possible.

The device 1 is adjoined by a deflection roll 19 for removing the bundled films from the device. References 12a, 12b, 12c denote second position determination devices which are designed here as optical surface sensors. Such a second position determination device is provided at each of the individual stations. The respective first position determination devices are also provided in each of the stations I, II, III on the individual servo shafts 3a, 3b.

The method according to the invention will be explained below with reference to FIGS. 2 to 4. In a first method step, an individual film is picked up by two gripping elements 8a, 8b arranged on the two servo shafts 3a, 3b. This gripped film is transported in the Y-direction and at the same time is aligned by a displacement of the two servo shafts 3a, 3b in the Y-direction. In addition, two printed mark positions of the film are interrogated by the two printed mark sensors 11a, 11b as the film passes. This interrogation is able to determine the precise position of the film in the Y-direction.

In a further method step, the movement in the Y-direction is stopped at a predetermined position defined on the basis of the determined position of the film. At this point, the two movement devices or servo shafts 3a, 3b are stopped.

The film 2 is thus already aligned in the Y-direction and is held by the gripping elements 8a, 8b on the movement device 3. In a further method step, the position of a further printed mark on the film is read for the purpose of determining the position thereof in the X-direction. This printed mark may be for example a cross or a circle, the precise position of which is determined with respect to a nominal position. For determining this position, use is made of the second position determination device 12 in the form of a surface sensor.

In a further method step the gripping elements 4a, 4b on the second movement device 5 are closed, and in a further method step the gripping devices 8 or the gripping elements 8a, 8b are opened. From this point onwards, therefore, transport in the X-direction is possible and the first gripping elements, which are responsible for the movement in the Y-direction, no longer have any influence on the movement of the film.

In a further method step, the film is transferred over a fixed path length by means of the second gripping elements 4a, 4b into the second station II and continues to be held by the second gripping devices 4. However, the reading of the position in the X-direction could also take place during the movement of the film.

In a further method step, in the station II, a second film 6 is pulled over the first film 2 in the Y-direction and is held there. This second film is also aligned in the Y-direction by the position determination devices 11a, 11b in the second station II, as described above. At the same time, a further film is also pulled in the Y-direction in the first station I. In a further method step, the position of the printed mark for the position in the X-direction of the second film 6 is in turn read by means of the surface sensor 12b. At the same time, this process also takes place on a further film 2 in the first station I. Taking account of the X-positions of the two films 2 and 6, which are now known, the film 2 is pulled under the film 6, which is held stationary. This means that, here too, the device is set in such a way that the position prior to alignment is always located in front of the target position in the X-direction, so that an alignment is possible in each case by pulling the film.

More specifically, in this method station, an alignment stroke of the movement device 5 or of the X-servo shafts 5a, 5b takes place by pulling the film 2 below the held film 6 according to the known X-positions of the two films 2 and 6.

In a further method step, the two films, which are now aligned, are fixed by a fixing device 9. In a further method step, the gripping elements of the two movement devices 3, 5 are opened and the two movement devices are in each case moved back into their starting positions, i.e. upwards in FIG. 1 in the case of the first movement device and towards the left in the case of the second movement device. In a further step, the two films, which are now aligned, are transported in the X-direction, wherein the fixing device prevents any displacement of the films with respect to one another. More specifically, the two films are transported into the third station III and then the fixing device 9 is opened. At the same time, the further first film 2 is transferred into the station II and a further film 6, as described above, is pulled over the film 2 by means of Y-transport and at the same time Y-alignment, and is held there. The parallel procedure takes place in the station III, although here a third film 7 is pulled over two films 2, 6 which are already aligned.

In a further method step, once again an alignment movement of the movement device 5 takes place by moving the film 2 below the held film 6 according to the known X-positions of the two films. The parallel procedure takes place in station III, i.e. here the bundle consisting of films 2 and 6 is pulled accordingly below the third film 7. From this point onwards, the individual method steps are repeated starting from the fixing of the aligned set of films by the fixing device 12a and 12b. The abovementioned separation of the individual films may take place for example by means of vacuum suction cups and blown air. FIG. 3 shows the situation in which the films have already been pulled and aligned in the Y-direction according to the known position of the Y-printed marks of the films, or the situation in which the aligned film is held by the gripping elements 8a, 8b of the first movement devices 3. FIG. 4 shows the situation once a return stroke of the X-movement devices 5 has taken place after all the sets of films have been aligned and fixed, and once a set of films has been transported away by the removal rolls 19.

It can be seen here that the movement between the individual stations in the X-direction is coupled, i.e. the movement of the film 2 from the station I into the second station II and the movement of the film 6 from the station II into the station III are coupled to one another. However, as already mentioned, the alignment takes place through a movement of the newly added film in each case, for example the film 6 in the second station II or the film 7 in the third station III. Account must be taken here of the fact that the control device knows the position of the respective lowermost film or set of films.

Figure 5:
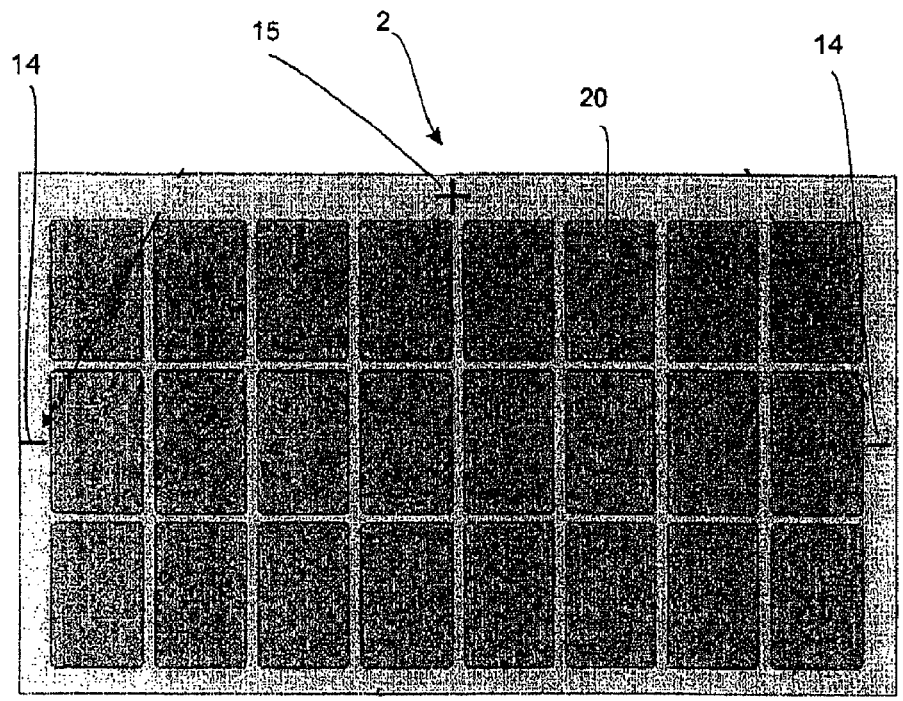
FIG. 5 shows a view of a film to be processed.

FIG. 5 shows a diagram of a film for a method according to the invention. This film comprises a plurality of card elements 20 which, once the individual films have been welded and bonded, are punched out of the composite. Y-printed marks 14 are also provided in each case at the right-hand and left-hand edge of the film, which Y-printed marks allow the alignment of the film in the Y-direction by means of the first position determination devices 11a, 11b. The Y-printed marks 14 therefore serve for detection by the printed mark sensor. Reference 15 denotes an X-printed mark, i.e. the printed mark which serves for position determination in the X-direction. This X-printed mark, which is designed here as a cross, is read by the optical surface determination sensors 12a, 12b and 12c.

Figure 6:
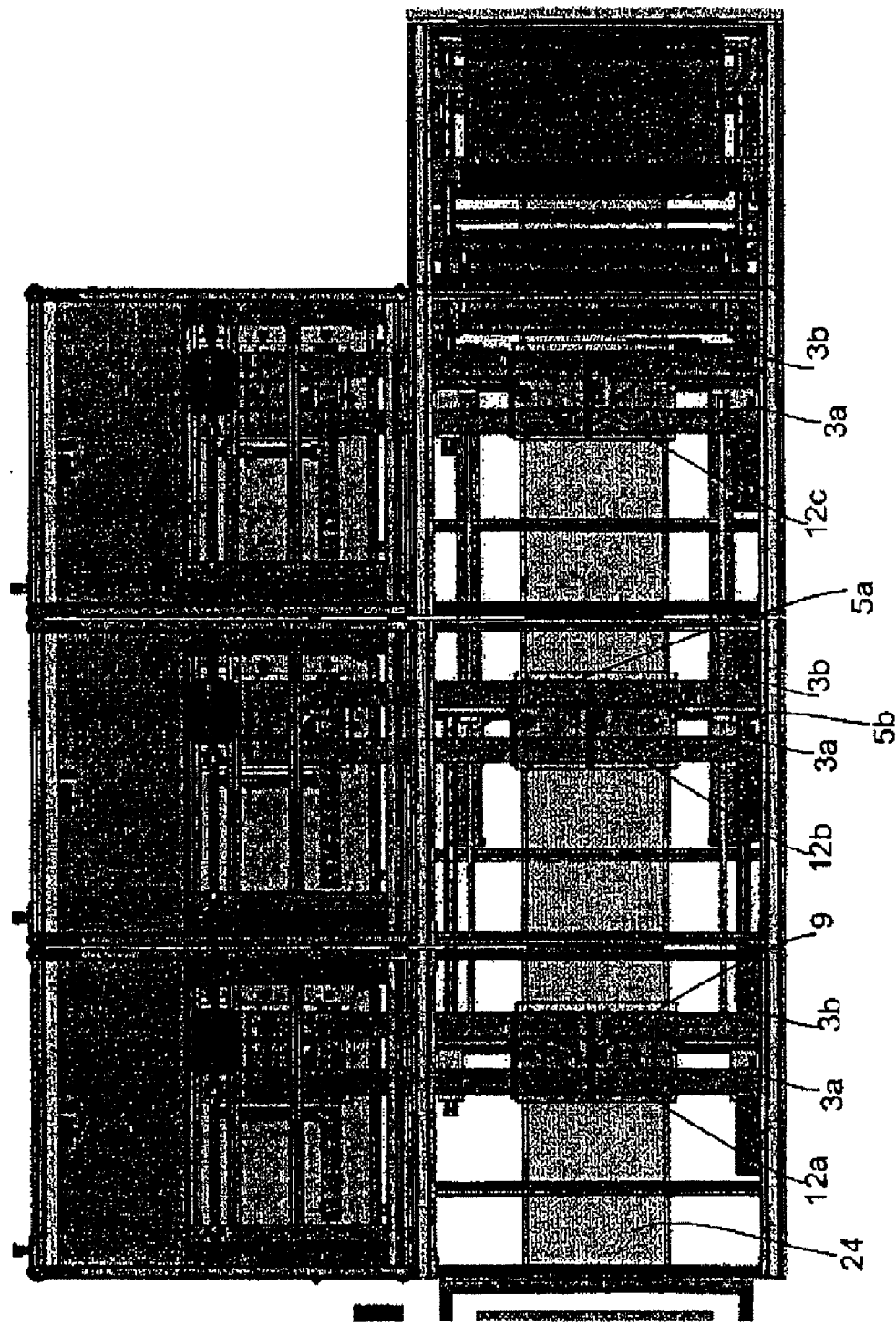
FIG. 6 shows a schematic overall diagram of a device according to the invention.

FIG. 6 shows a further overall diagram of a device according to the invention. As mentioned, this device here comprises three stations for arranging three films one on top of the other on an endless film 24. This endless film is likewise moved in the X-direction. Also in this diagram, it is possible to see the individual movement devices 3a, 3b, 5a, 5b.

All of the features disclosed in the application documents are claimed as essential to the invention in so far as they are novel individually or in combination with respect to the prior art.

LIST OF REFERENCES 1 device
2, 6, 7 films
3 movement device
3a, 3b servo shafts
4 second gripping devices
4a, 4b gripping elements
5 second movement device
5a, 5b servo shafts
8 first gripping devices
8a, 8b gripping elements
9 fixing device
11 first position determination device
11a, 11b printed mark sensors
12 position determination device
12a, 12b, 12c second position determination devices
13 linear guides
14 Y-printed mark
15 X-printed mark
19 deflection roll
20 card element
21, 22 unwinding devices or rollers
24, 25 endless films
27 stack
29, 31 buffer devices
32 stack

The invention claimed is:

1. A method for producing film composites, comprising the steps:
   picking up a first film by a first gripping device that moves only in a first transverse movement direction;
   moving the first gripping device together with the first film in the first movement direction, where a distance moved in the first movement direction is greater than a size of the film in the first movement direction;
   determining the position of the first film in the first movement direction;
   fixing the first film at a predefined position in the first movement direction;
   determining the position of the first film in a second transverse movement direction, said second movement direction being substantially perpendicular to the first movement direction; and
   moving the first film in the second movement direction, wherein the first film is gripped by a second gripping device that moves only in the second movement direction for transport in the second movement direction, and where a distance moved in the second movement direction is greater than a size of the film in the second movement direction.

2. The method according to claim 1, further comprising pulling the first film at least in sections over or under a second film and aligning the films with respect to one another based on their respectively determined positions.

3. The method according to claim 2, wherein the first film and the second film are aligned with respect to one another in the second movement direction.

4. The method according to claim 2, further comprising detaching the gripping devices, once the films have been aligned.

5. The method according to claim 4, further comprising bonding the films to at least one film carrier.

6. The method according to claim 1, further comprising pulling a second film at least in sections over or under the first film, and aligning the films with respect to one another based on their respectively determined positions.

7. The method according to claim 6, wherein the first film and the second film are aligned with respect to one another in the second movement direction.

8. The method according to claim 6, further comprising detaching the gripping devices, once the films have been aligned.

9. The method according to claim 8, further comprising bonding the films to at least one film carrier.

10. The method according to claim 7, further comprising bonding the first and second films together once they are aligned, pulling the bonded first and second films at least in sections over or under a third film and aligning the films with respect to one another based on their respectively determined positions.

11. A device for producing film composites, comprising:
   a first movement device with a first gripping device arranged on the first movement device for gripping a first film and moving the first film in a first transverse movement direction, where the first movement device moves the first film a distance in the first movement direction which is greater than a size of the first film in the first movement direction;
   a first position determination device for determining the position of the first film in the first movement direction;
   a control device for controlling the movement of the first movement device in reaction to the position determined by the first position determination device;
   a second movement device with a second gripping device arranged on the second movement device for gripping the first film and moving the first film in a second transverse movement direction, where the second movement device moves the first film a distance in the second movement direction which is greater than a size of the first film in the second movement direction; and a second position determination device for determining the position of the first film in the second movement direction, wherein the first gripping device moves essentially only in the first movement direction and the second gripping device moves essentially only in the second movement direction, said second movement direction being substantially perpendicular to said first movement direction.

12. The device according to claim 11, wherein the first position determination device comprises a printer's imprint sensor.

13. The device according to claim 11, wherein the second position determination device comprises a surface sensor.

14. The device according to claim 11, further comprising an additional set of movement devices, gripping devices and position determination devices, said additional set of devices being arranged to position a second film in alignment with the first film in the first and second movement directions.

15. The device according to claim 14, further comprising a fixing device for bonding the first film to the second film after they are aligned.

16. The device according to claim 11, wherein the first movement device and the second movement device are each comprised of a pair of servo shafts.

17. The device according to claim 16, wherein each individual servo shaft in each pair of servo shafts can be moved independently of the other.

* * * * *